United States Patent [19]

Wilson et al.

[11] 4,199,946
[45] Apr. 29, 1980

[54] INTEGRATED CONTROL FOR BRAKE AND STEERING SYSTEMS

[75] Inventors: Robert K. Wilson, Granger; Jerome T. Ewald, South Bend, both of Ind.

[73] Assignee: The Bendix Corporation, Southfield, Mich.

[21] Appl. No.: 882,716

[22] Filed: Mar. 3, 1978

[51] Int. Cl.² .......................................... B60T 13/00
[52] U.S. Cl. .................... 60/547 B; 60/582; 91/530; 137/637.4
[58] Field of Search ............... 60/547, 547 A, 547 B, 60/548, 562, 581, 582, 403; 91/391 R, 375 R, 375 A, 530; 137/596, 637.4, 637.5

[56] References Cited

U.S. PATENT DOCUMENTS

| | | | |
|---|---|---|---|
| 3,018,622 | 1/1962 | Werts | 137/637.4 |
| 3,630,233 | 12/1971 | Miyamoto | 91/375 A |
| 3,733,817 | 5/1973 | MacDuff | 60/548 |
| 3,898,808 | 8/1975 | Ewald | 60/403 |
| 4,026,396 | 5/1977 | Hubl | 137/637.4 |
| 4,072,011 | 2/1978 | Ewald | 60/548 |
| 4,121,421 | 10/1978 | Myers | 60/582 |

Primary Examiner—Abraham Hershkovitz
Attorney, Agent, or Firm—Leo H. McCormick, Jr.; Ken C. Decker

[57] ABSTRACT

An integrated control mechanism for regulating the communication of pressurized fluid from a source to a brake system and a steering system of a vehicle in response to independent operator brake and steering signals. The integrated control mechanism has a housing with a bore therein connected to a single source of fluid under pressure. A rotary valve located in the bore is rotated in response to an operator steering signal to control the communication of the pressurized fluid to the steering system from the bore and thereby provide a power assist in steering the vehicle. A spool valve, concentrically located in said bore with respect to said rotary valve, linearly moves in response to an operator braking signal to control the communication of the pressurized fluid from the bore to the brake system and thereby provide a power assist in effecting a brake application.

14 Claims, 10 Drawing Figures

INTEGRATED CONTROL FOR BRAKE AND STEERING SYSTEMS

BACKGROUND OF THE INVENTION

Hydraulic brake boosters, such as disclosed in U.S. Pat. No. 3,831,491, have been proposed for general use in vehicles because of their compactness and reliability. In such brake boosters, an input force from the operator, which is modified through a ratio changer, moves a valve to allow a proportional volume of fluid under pressure to actuate the wheel brakes of the vehicle.

In order to maintain the number of components attached to the drive train of the motor of the vehicle at a minimum, it was suggested, as disclosed in U.S. Pat. No. 3,838,629, that a portion of the output of the pump that supplies the power steering gear be diverted to operate the hydraulic brake booster.

In an effort to better utilize the space available under the hood of vehicles, U.S. patent application Ser. No. 670,513 and now U.S. Pat. No. 4,072,011 discloses a single housing for retaining both a hydraulic brake booster and a power steering gear. A flow control valve in the housing, in response to a brake actuator signal, diverts a portion of the output of the pump away from the rotary valve in the steering gear to provide the hydraulic brake booster with a power assist.

Later, as disclosed in U.S. patent application Ser. No. 832,135, a single valve was devised to operate in translatory and rotational modes to control the communication of pressurized fluid to a valve system and/or a steering system corresponding to independent operator brake and steering signals.

SUMMARY OF THE INVENTION

We have devised a control mechanism having a unitary rotary and spool valve arrangement for controlling the communication of pressurized fluid from the pump to both a hydraulic brake booster and a power assist steering gear in response to independent brake and/or steering input signals from an operator.

The control mechanism is located in a housing having first and second bores therein. The first bore has first and second ports connected to a pump and third and fourth ports connected to the steering gear. The second bore is connected to the braking system. A sleeve located in the first bore has a series of grooves and corresponding radial passages for connecting the first and second ports with the interior of the sleeve.

A rotary valve which includes a cylindrical member located in the sleeve is connected to the steering system. The cylindrical member has a first axial bore therethrough and second series of radial passages therein. The first axial bore is connected with the first and second ports through the first series of radial passages in the sleeve.

A spool valve which includes a second cylindrical member is located in axial bore in the rotary valve. The second cylindrical member has a first peripheral groove separated from a second groove by first and second metering lands. The second cylindrical member has a second axial bore therethrough for connecting the first axial bore to a booster chamber in the hydraulic brake booster. The second axial bore is connected to a reservoir through a third series of radial passages which extend into the second groove of the second cylindrical member.

A piston located in the second bore of the housing separates the boost chamber from a hydraulic pressurizing chamber in the brake booster. The hydraulic pressurizing chamber is connected to the wheel brakes of the vehicle.

A linkage member which has a first end pivotally connected to the piston has a second end connected to the spool valve. The linkage member is connected to an input push rod attached to a brake pedal.

An input force applied to the brake pedal is transmitted through the push rod to the linkage member to effect a brake application. The linkage member responds to the input force by pivoting about the first end and moving the spool valve with respect to the rotary valve to allow pressurized fluid to flow past the second metering land into the second axial bore for distribution to the boost chamber. The fluid in the boost chamber acts on and moves the piston to pressurize the fluid in the hydraulic pressurizing chamber and create and operational brake pressure to effect the brake application.

An accumulator dump valve which is connected to the hydraulic pressurizing chambers receives the operational brake pressure. Whenever a predetermined pressure differential occurs between the operational brake pressure and fluid pressure in the boost chamber, the dump valve is actuated and stored fluid under pressure enters the booster chamber to assist in moving the piston.

At the same time, should the operator desire to turn the wheels of the vehicle, a steering signal is transmitted through the rotary valve, a torsion bar, and into a pinion for moving a rack which is attached to the wheels of the vehicle. Rotation of the rotary valve restricts the flow of the fluid under pressure between the first port and one of the third and fourth ports. This flow restriction causes a pressure differential to occur across a piston associated with the rack. The pressure differential across the piston provides a power assist for moving the rack aid in turning the wheels of the vehicle. The pinion which is connected to the sleeve, rotates the same to maintain the restrictive flow condition for the duration of the steering signal.

It is an object of this invention to provide a brake and steering system with an integral control mechanism which is responsive to independent operator brake and steering signal for providing power assist in the operation of the brake and steering systems.

It is another object of this invention to provide an integral control mechanism with a rotary valve and a concentric spool valve for regulating the flow of pressurized fluid from a single source to provide a power assist in the operation of a brake system and a steering system.

It is a further object of this invention to provide an integral control mechanism having a rotary valve and a spool valve that are responsive to independent and/or simultaneous operator braking and steering signals for regulating the communication of pressurized fluid to a brake and steering system to provide an assist in effecting a brake application and/or steering maneuver of the vehicle.

These and other objects should be apparent from reading this specification and viewing the drawings.

DETAILED DESCRIPTION OF THE INVENTION

Figure 1:
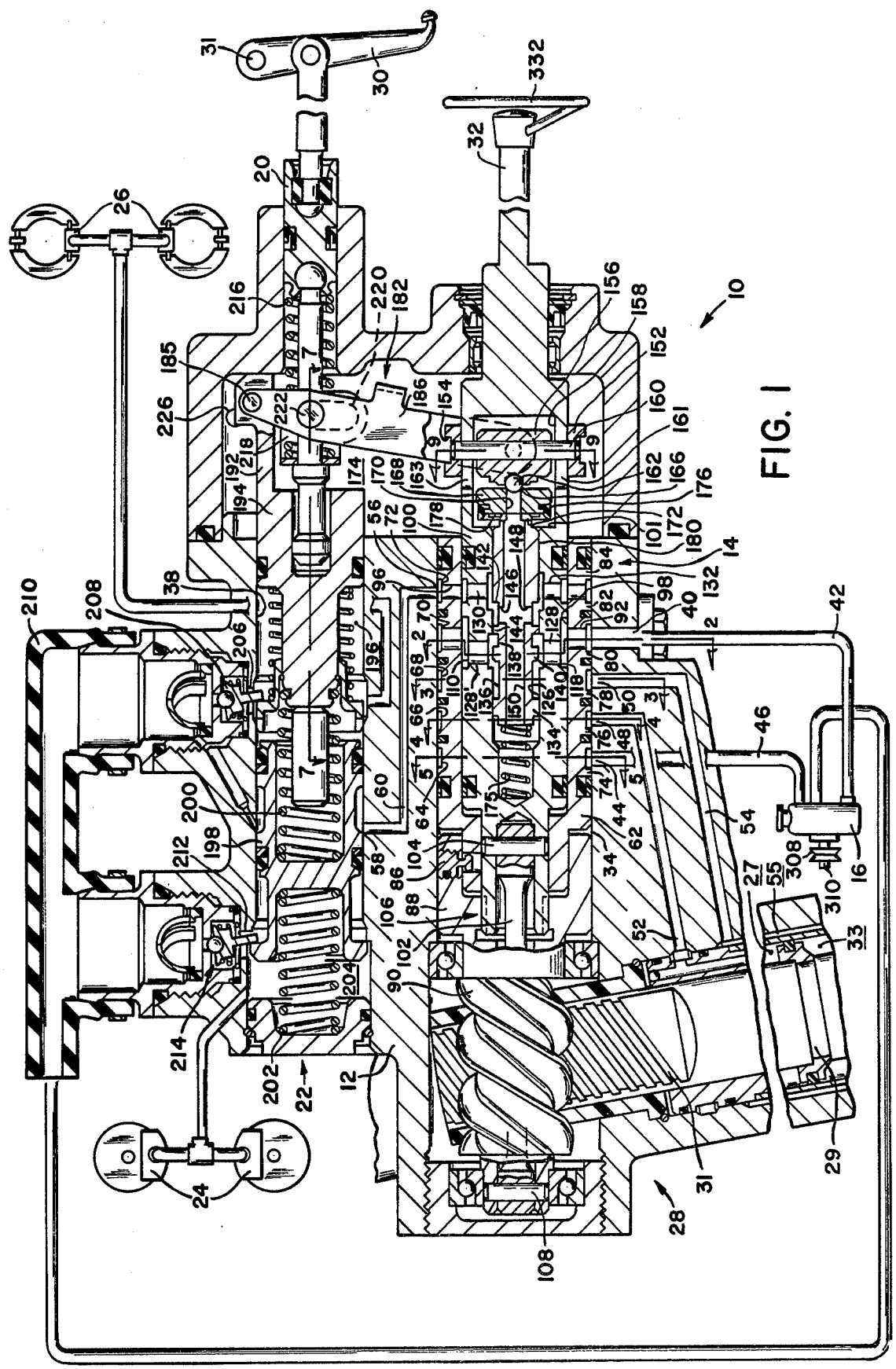
FIG. 1 is a schematic illustration of brake and steering systems showing a sectional view of an integrated control mechanism made according to the teachings of this invention for regulating the communication of pressurized fluid from a source to provide a power assist in the independent operation of the brake and steering systems.

The common fluid brake and steering system 10 shown in FIG. 1 has a housing 12 for retaining an integrated control mechanism 14 through which pressurized fluid from pump 16 is distributed to provide a power assist in the operation of a brake system and a steering system.

The brake system has a booster mechanism 22 connected to the front and rear wheel brakes 24 and 26.

The steering system is connected to the front wheels associated with wheel brakes 24 through a rack and pinion steering gear 28 of the type fully disclosed in U.S. patent application Ser. No. 822,572, filed Aug. 8, 1977 and now U.S. Pat. No. 4,123,965.

In response to an operator brake input to the brake pedal 30, the brake booster 22 is operated to effect a brake application. When operated, a push rod 20 connected to the brake pedal activates the control mechanism 14 and allows communication of a fluid under pressure from pump 16 to aid in the operation of the brake booster.

If during this same period of time, the operator desires to turn the wheels of the vehicle, a steering input applied to shaft 32 from wheel 31 is transmitted to the rack and pinion steering gear 28. The steering input causes a shaft 32 to rotate and activate the steering portion of control mechanism 14. Rotational activation of control mechanism 14 causes a pressure differential to occur in the fluid communicated to the rack and pinion steering gear 28. This pressure differential causes the rack to move and assist in turning the wheels of the vehicle. The movement of the pinion by the rack is carried into the control mechanism 14 to maintain the pressure differential condition of the fluid communicated to the rack as long as the operator maintains the steering or turn input signal.

In more particular detail the housing 12 of control mechanism 14 has a first bore 34 and a second bore 38 located therein. The first bore 34 has a port 40, connected to supply conduit 42 of pump 16, a port 44 connected to return conduit 46 of pump 16, ports 48 and 50 connected to the steering gear 28 by conduits 52 and 54, respectively, and port 56 connects to relief port 58 in the second bore by passage 60.

A sleeve 62 having grooves 64, 66, 68, 70 and 72 separated by lands 74, 76, 78, 80, 82, and 84 is aligned with ports 40, 42, 48, 50, and 56 in bore 34. A fastener member 86 extends through projection 88 on pinion 90 to connect sleeve 62 with the steering gear 28. The sleeve has radial passages 92, 94 and 96 for connecting ports 40, 44, and 56 with the interior bore 98.

A rotary valve having a cylindrical body 100 is located in bore 98. The cylindrical body 100, which is connected to shaft 32, is also connected to pinion 90 through a key-slot connection 106. The key-slot connection 106, as is common practice, has a predetermined amount of clearance to allow rotary input from shaft 32 to rotate the cylindrical body 100 prior to movement of the pinion 90. However, cylindrical body 100 is fixed to torsion bar 102 by pin 104 which in turn is connected to pinion 90 through pin 108.

Figure 2:
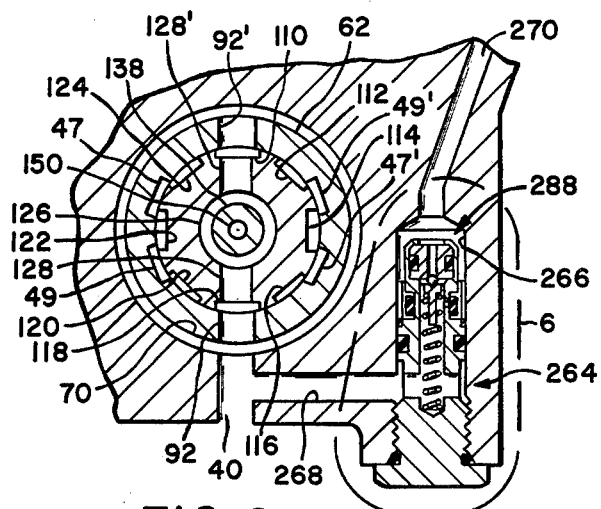
FIG. 2 is a sectional view taken along line 2—2 of FIG. 1 showing a charging valve through which pressurized fluid is communicated to an accumulator.
Figure 3:
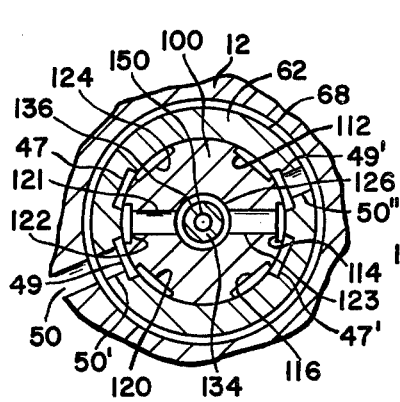
FIG. 3 is a sectional view taken along line 3—3 of FIG. 1.
Figure 4:
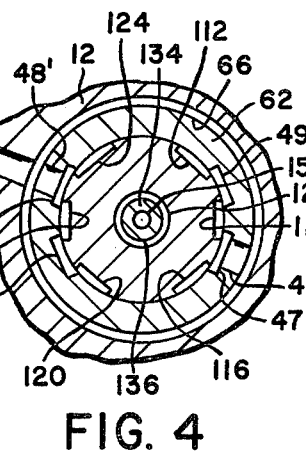
FIG. 4 is a sectional view taken along line 4—4 of FIG. 1.
Figure 5:
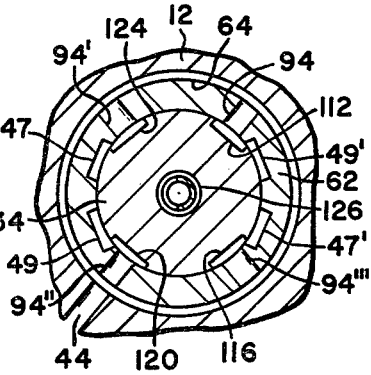
FIG. 5 is a sectional view taken along line 5—5 of FIG. 1.

The cylindrical body 100 has a series of axial slots 110, 112, 114, 116, 118, 120, 122, and 124, located on the periphery thereof, as best seen in FIGS. 1, 2, 3, 4 and 5. Slots 110, and 118, as shown in FIG. 2, are connected to the supply port 40 through radial bore 92 and 92' in sleeve 62. Slots 112 and 120, as shown in FIG. 3, are connected to port 50 going to conduit 54 by way of radial passages 50' and 50''. Similarly, slots 114 and 122, as shown in FIG. 4, are connected to port 48 going to conduit 52 by way of radial passages 48' and 48''. Slots 116 and 124 as shown in FIG. 5, are connected to the return port 44 by radial bores 94' and 94'''. The cylindrical body 100 has an axial bore 126 located therein. A first series of radial passages 128, 128', as shown in FIG. 2, connects axial bore 126 in the cylindrical body 100 with the supply port 40 and a second series of radial passages 121 and 123, as shown in FIG. 3, connects the axial bore 126 with the return port 44 by way of slots 114 and 122. A third series of radial passages 130 and 132 in the cylindrical body 100 connect the axial bore 126 to the second bore 38 by way of radial passage 96 in sleeve 62, port 56, passage 60 and relief port 58.

A spool valve having a cylindrical body 134 is located in axial bore 126. The cylindrical body 134 has a first groove 136 separated from a second groove 138 by a first metering land 140 and a third groove 142 separated from the second groove 138 by a second metering land 144. Cylindrical body 134 has a axial bore 150 that extends therethrough. Radial passages 146 and 148 in cylindrical body 134 connect groove 142 with axial bore 150.

A collar 152 which surrounds the cylindrical body 100 of the rotary valve has a groove 154 on the periphery surface thereof. A first disc 156 located in bore 158 of cylindrical body 100 is attached to collar 152 by a pin 160. A ball 162 pressed into hole 164 in the first disc 156 forms a seat for face 166 on the second disc 168.

The second disc 168 has an axial bore 170 which connects bore 150 in the spool valve with face 166. The second disc 168 in located adjacent the end of cylindrical body 134. Radial slots 172 adjacent the end of cylindrical body 100 provides a flow path between axial bore 150 and boost chamber 174. A seal 176 attached to the front face 178 of the second disc 168 is adapted to engage cylindrical body 100 and prevent the flow of pressurized fluid from the boost chamber to the relief port 56 through the clearance between land 180 and bore 126.

A linkage member 182 consisting of arms 184 and 186 joined together by brace 185 have a first end attached to the spool valve by pins 188 and 190 located in groove 154 in collar 152 and a second end pivotally attached to projection 192 on piston 194.

Piston 194 which is located in the second bore 38 separates a pressurizing chamber 196 formed therein from boost chamber 174. Piston 194 is separated from another piston 198 in bore 38 by spring 200 to define the limits for pressurizing chamber 196. Piston 198 is separated from the bottom of bore 38 by return spring 202 to define a second pressurizing chamber 204 therein.

Housing 12 has a compensation port 206 with a valve 208 located therein. Valve 208 controls the communication of fluid between chamber 196, manifold 210, and the reservoir in pump 16. Similarly, a tilt valve 214 located in compensator port 212 controls fluid communication between chamber 204, manifold 210, and the reservoir in pump 16.

A push rod 20 attached to brake pedal 30 is connected by a spring 216 to a bracket 218. Bracket 218 is connected to linkage member 182 by pin 222. Bracket 220 has a slot 220 therein to allow pin 222 to move as linkage member 182 moves in an arc about pin 185.

Figure 7:
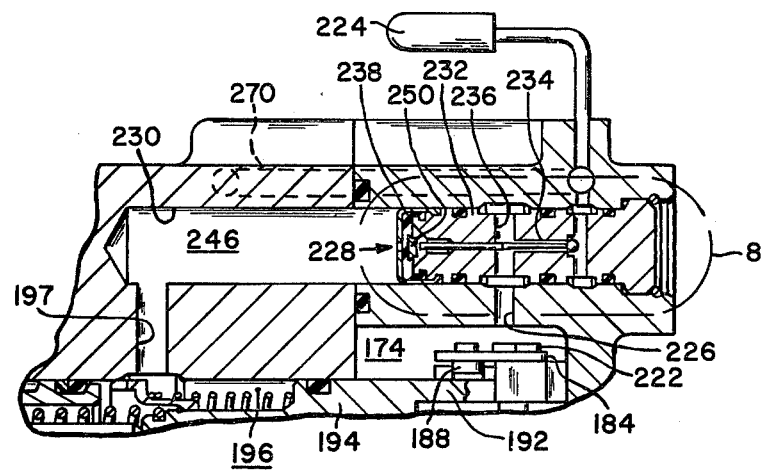
FIG. 7 is a sectional view taken along line 7—7 in FIG. 1 showing an accumulator dump valve through which pressurized fluid in the accumulator is added to the boost chamber.

Boost chamber 174 is connected to an accumulator 224, see FIG. 7, through passage 226 in housing 12. The communication of pressurized fluid from the accumulator 224 is controled by a hydraulically operated dump valve 228 located in bore 230 of housing 12.

As best seen in FIG. 7, the dump valve 228 has a cylindrical member 232 held in bore 230 by a snap ring 231. Cylindrical member 232 has an axial bore 234 extending to a cross bore 233 and a radial bore 236 which is connected to passage 226 in housing 12.

Figure 8:
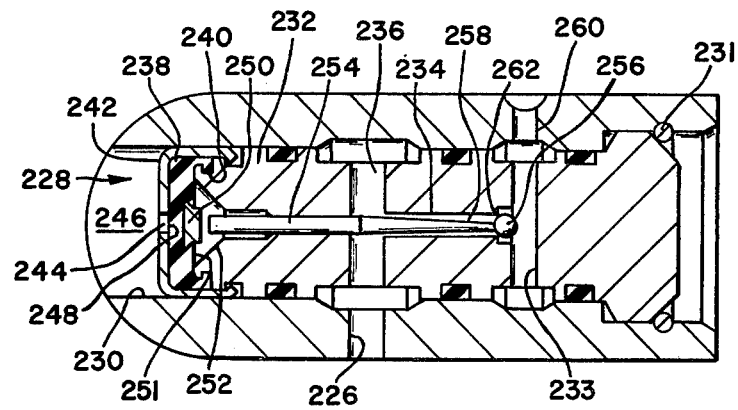
FIG. 8 is an enlarged view of the circumscribed line 8 in FIG. 7.

A diaphragm 238 as shown in FIG. 8 has a bead which is secured in a groove 240 by a retainer cap 242 to prevent fluid communication between axial bore 234 and chamber 246. However, the retainer cap 242 has a central hole 244 through which pressurized fluid from chamber 196 is communicated from chamber 246 to act on face 248. A recess 252 in cylindrical member 232 allows the diaphragm 238 to move toward a stem 254 of a poppet valve in response to a pressure differential between the fluid in chamber 246 and axial bore 234. A metal insert 250 is attached to the diaphragm 238 to prevent the engagement of stem 254 from damaging the diaphragm 238.

The stem 254 of the poppet valve has a tapered surface 258 to which a spherical head 256 is attached. The pressurized fluid in accumulator 224 and passage 260 connected thereto act on and holds spherical head 256 against seat 262 to prevent fluid communication from the accumulator 224 to the boost chamber 174 in the absence of a predetermined fluid pressure in chamber 246.

The fluid pressure in the accumulator 224 is maintained at the pressure level of the pump 16 by a charging valve 264 located in bore 266 in housing 12. Bore 266 is connected to the supply port 40 by a passage 268 and to the accumulator 224 by a passage 270.

Figure 6:
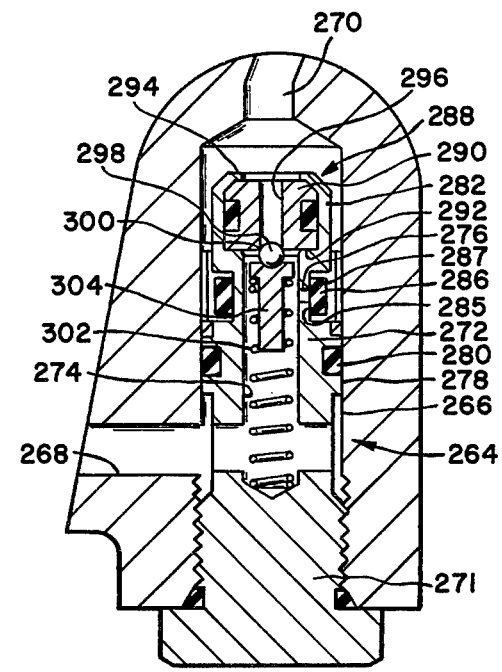
FIG. 6 is an enlarged view of circumscribed line 6 in FIG. 2.

Charging valve assembly 264, as shown in FIG. 6, has a cylindrical body 272 attached to housing 12 by a threaded connector 271. The cylindrical body 272 has a central bore 174 located therein. The periphery of cylindrical body 272 has a first diameter surface 278, that cooperates with seal 280 to segregate passage 268 from passage 270, and a smaller second diameter section 272. A groove 285 which separates the first diameter 278 from the second diameter 282 has a series of passages 276 therethrough (only one being shown) for connecting bore 274 with bore 266. A resilient band 286 located in groove 285 has a first surface exposed to the fluid pressure in bore 274 and a second surface exposed to the fluid pressure in bore 266 which is equal to accumulator pressure.

The charging valve assembly 264 further includes a relief valve 288 located in bore 274 for preventing the fluid pressure in the accumulator 224 from exceeding a predetermined value. The relief valve 288 has a plug 290 which is held against shoulder 292 by tabs 294. Plug 290 has a passage 296 which connects conduit 270 with bore 284. A poppet member has a ball 298 located in bore 284. Ball 298 is urged toward a seat 300 by the resilient force of spring 302 acting through stem 304 and the pressurized fluid in bore 274 to seal passage 296.

MODE OF OPERATION OF THE INVENTION

When the engine in a vehicle equipped with a brake and steering system 10, shown in FIG. 1, is operating, pully wheel 308 connected to the crankshaft continually rotates shaft 310 in pump 16 to produce a source of flowing fluid under pressure. The fluid flows from pump 16 through conduit 42 to inlet passage 40 in control mechanism 14.

Fluid simultaneously flows from port 40 to the charging valve 264 through passage 268 and through radial passages 92, 92' in sleeve 62, slots 110 and 118, and to the interior of the spool valve after flowing through radial passages 128 and 128' in the cylindrical body 100 of the rotary valve, past metering land 140 in the cylindrical body 134 and into groove 136. The fluid flows from the interior of the spool valve along a similar return flow path from groove 136 to return port 44 by flowing through radial passages 121 and 123 in the cylindrical body 100 of the rotary valve and into slots 114 and 122 as shown in FIG. 3 and through radial passages 94, 94', 94" and 94''', as shown in FIG. 5, to groove 64 for distribution to return port 44.

In the absence of a steering input the pressurized fluid flows through slots 114 and 122. In this condition, slots 112 and 120 which are connected to groove 68, and slots 116 and 124 which are connected to groove 66 communicate fluid equally to conduits 52 and 54 to permit the fluid to freely flow through axial passages 47 and 47' and 49 and 49' in returning to the reservoir by way of groove 64 and passage 46.

As best shown in FIG. 6, the pressurized fluid from the pump 16 is transmitted through conduit 268 to the charging valve 264. Fluid enters bore 274 and is presented to face 285 of the resilient band 286 by flowing through passages 276. If the fluid pressure in the accumulator 224 which acts on face 287 of the resilient band 286 is less than a predetermined fluid pressure level, the resilient band expands from the force of the fluid pressure acting on face 285 and allows fluid under pressure to flow to the accumulator 224 through passage 276, bore 274, between diameter 282 and the housing wall of bore 266 and passage 270. As the fluid pressure in the accumulator increases, the fluid pressure acts on face 287 and urges the resilient band 286 toward face 285 to terminate the flow of fluid through passage 276 when the predetermined fluid pressure level is reached in the accumulator 224.

The fluid pressure level in accumulator 224 is prevented from exceeding a set level by the relief valve 288 shown in FIG. 6. Should the pressure in the accumulator 224 increase above this set level, such as can occur through thermal expansion, the pressure is reduced by the relief valve 288. The accumulator pressure is continually communicated through passage 296 and acts on ball 298. Whenever this pressure is sufficient to overcome the force of spring 302, the pressure acting on the back side of ball 298 moves the ball 298 away from seat 300 and allows a portion of the fluid in passage 270 to flow into bore 284 for distribution to the reservoir in the pump 16.

Figure 10:
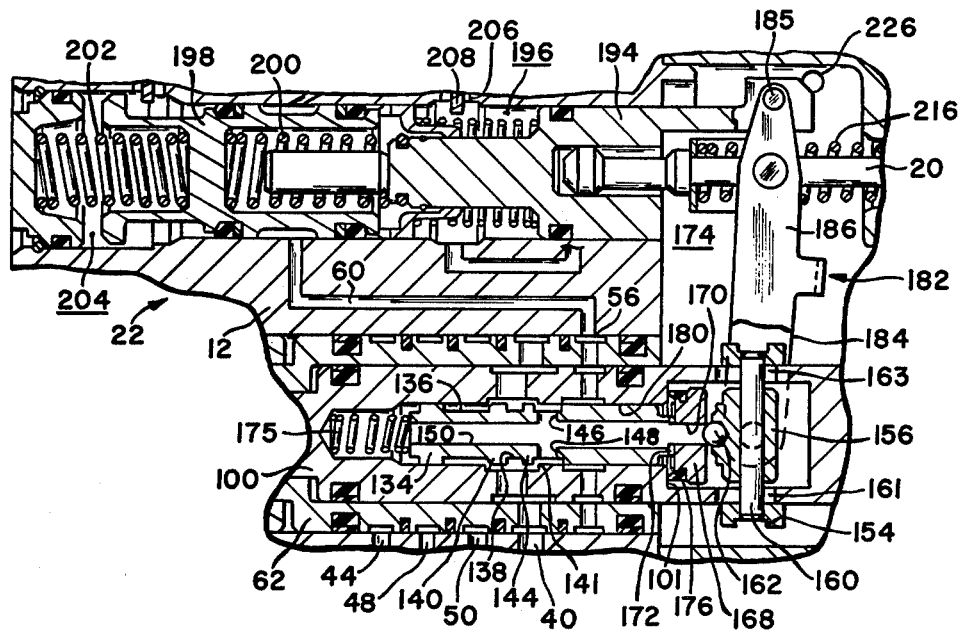
FIG. 10 is a sectional view of the control mechanism illustrating the relationship of the various components during a power brake assist.

When the operator desires to effect a brake application, an input force or brake signal is applied to brake pedal 30. This input force causes brake pedal 30 to rotate about pin 31 and impart a linear input force to push rod 20. Initial movement of push rod 20 is transmitted through spring 216 to bracket 218 causing arms 184 and 186 of linkage member 182 to pivot about pin 185. As the linkage member 182 pivots, pin 160 attached to collar 152 slides in slots 161 and 163 on cylindrical body 100 of the rotary valve. Movement of the collar 152 allows seal 176 to engage face 101 and segregate the boost chamber 174 from bore 180. At the same time metering land 144 on the spool valve moves away from land 141 as shown in FIG. 10 and allows fluid under pressure to flow from radial passages 128 and 128' into bore 150. This fluid under pressure flows past slots 172 and into the boost chamber 174 after passing through the one way seal 176. The fluid under pressure in boost chamber 174 acts on and moves piston 194 to initially close the tilt valves 208 and 214. Thereafter the fluid in chambers 196 and 204 is pressurized by movement of pistons 194 and 198 and supplied to the wheel brakes 24 and 26 to effect a brake application corresponding to the input force applied to push rod 20 through brake pedal 30.

During a brake application, the pressurized fluid from chamber 196 flows through passage 197, as shown in FIGS. 7 and 8, into chamber 246. The fluid pressure in chamber 246 is transmitted through passage 244 to face 248 of diaphragm 238 in the dump valve 228. The fluid under pressure present in boost chamber 174 is communicated to the opposite face 251 of the diaphragm 238 after passing through passage 226, radial passage 236 and axial bore 234. When the pressure differential between the brake pressure in chamber 246 and the boost pressure in chamber 174 reach a predetermined value, diaphragm 238 moves toward cavity 252 and insert 250 engages the end of stem 254. Thereafter, an increase in the brake pressure in chamber 246 moves stem 254 to unseat ball 256 from seat 262 and allows the pressurized hydraulic fluid present in the accumulator 224 to flow into the boost chamber 174 and provide an assist in moving the piston 194 in bore 38 to further pressurize the fluid in chambers 196 and 204. When accumulator fluid in the boost chamber 174 acts on disc 168, seal 176 is held against face 101 to prevent any loss of fluid between land 180 and bore 126 and assure that the braking force developed thereby is entirely directed to moving the piston 194 in bore 38.

When the input force on brake pedal 30 terminates, push rod 20 pivots arms 184 and 186 about pin 185 causing pin 160 to move in slots 161 and 163 to a position illustrated in FIG. 1. Disc 176 remains positioned against the cylindrical body 100 of the rotary valve because of the pressure differential between the fluid pressure in boost chamber 174 and the pump pressure in axial bore 150. Since ball 162 is attached to disc 156, passage 170 is opened and the fluid in the boost chamber 174 flows into passage 150. At some lower pressure in boost chamber 174, return spring 175 moves the cylindrical body 134 of the spool valve such that metering land 144 interrupts communication of the supply fluid present in radial bore 128 and 128' from supply port 40. Thereafter, seal 176 moves away from face 101 and bore 150 is opened to the pump reservoir through radial passages 130, 132, 96 and 96', groove 56, and relief passage 60.

Thereafter, charging valve 264 allows fluid under pressure from pump 16 to flow to accumulator 224 through the action of resilient band 286 on passages 276 in the cylindrical body 272. Initial flow of hydraulic fluid from pump 16 through passage 270 to the accumulator 224 acts on ball 256 and urges the same against seat 262 to prevent communication from the accumulator 224 to the boost chamber 174. When the accumulator 224 is charged to a predetermined pressure level, resilient band 286 seats face 285 on the housing surrounding the openings 276 at the bottom of groove 274 to prevent further fluid communication from passage 268 to the accumulator 242.

Should the operator desire the change the direction of the vehicle either during a braking operation or independently, a rotary steering input is applied to wheel 332 which causes shaft 32 to correspondingly rotate.

Figure 9:
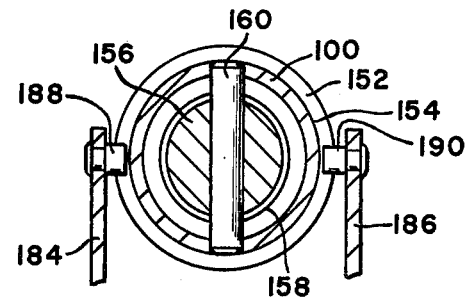
FIG. 9 is a sectional view taken along line 9—9 in FIG. 1.

Rotation of shaft 32 does not effect the braking operation since pivot pins 188 and 190 of the linkage member 182, as shown in FIG. 9, are located in groove 154 and not fixed to collar 152. Thus, the steering signal is independently transmitted to the spool valve and is not effected by any linear movement of cylindrical body 134 caused by a brake signal.

For illustrative purposes assume the operator desires to steer the vehicle to the right. A steering input applied to shaft 32 rotates the cylindrical body 100 of the rotary valve, as viewed in FIGS. 2–5, in a clockwise direction to restrict the flow of pressurized fluid from radial passages 121 and 123 and slots 114 and 122 into passages 49 and 49' while allowing the output of pump 16 to freely flow into passages 47 and 47'. Flow from passages 47 and 47' is correspondingly restricted into passages 116 and 124 but freely flow through radial bores 48' and 48" into groove 66 through outlet bore 48 into conduit 52 for distribution to chamber 27 in the steering gear 28. At the same time, chamber 33 in the steering gear is freely connected to the reservoir in the pump by way of the following flow path: conduit 54; outlet port 50; groove 68; radial bores 50' and 50"; passages 49 and 49'; slots 112 and 120, groove 64; outlet port 44; and return conduit 46. With the pump pressure in chamber 27 and reservoir pressure in chamber 33, a pressure differential is created across piston 29. This pressure differential acts on piston 29 and moves rack 31 to supplement the rotary steering force transmitted to rack 31 from cylindrical body 100 through torsion bar 102 by way of pinion 90. The rotary input applied to the pinion 90 is carried back to sleeve 62 through cylindrical member 88 to proportionally reduce the restrictive flow relationship between the axial slots 114 and 122 in cylindrical body 100 and slots 47, 47' and 49, 49' in sleeve 62.

When the steering signal and rotary input are balanced, the fluid flow passages in the sleeve 62 and cylindrical body 100 of the rotary valve assumes the position shown in FIGS. 2–5. Thereafter, the pressure differential across piston 29 terminates and the flow of fluid to the reservoir through the control mechanism 14 commences without any restriction.

Similarly when the steering input signal rotates the shaft 32 in the counterclockwise direction to effect a left turn, the flow from the pump is directed to chamber 33 as chamber 27 is communicated to the reservoir through outlet port 44.

Thus, as described above, the integrated control mechanism 14 is adopted to respond to independent brake and steering input signals, which do not effect the operation of either, to provide a power assist in the operation of the braking or steering systems.

We claim:

1. In a vehicle having fluid power assisted braking and steering systems, an integrated control mechanism for regulating fluid communication from a single source to the braking and steering systems, said integrated control comprising:
   a housing having a bore therein connected to said single source of fluid;
   rotary valve means located in said bore, and rotating in response to an operator steering signal for controlling the communication of said single source of fluid to said steering system;
   sleeve means concentrically located in said bore with respect to said rotary valve means and responsive to an operational feed back signal from said steering system to match the communication of fluid from the source to the steering system with the operator steering signal;
   spool valve means having a first cylindrical member concentrically located in said bore with respect to said rotary valve means, said first cylindrical member having an axial bore therethrough connected to a peripheral groove by radial passages, said first cylindrical member linearly moving in response to an operator braking signal to meter said single source of fluid into said groove, through said radial passages and into said axial bore; and
   a disc located adjacent to said first cylindrical member having a seal located on a face surface thereof, said disc moving in response to a predetermined operator braking signal and engaging said rotary valve means to prevent the flow communication from the single source of fluid through said axial bore and through a one-way seal for communication to said braking system.

2. The integrated control mechanism, as recited in claim 1 further including:
   a boost chamber connected to said brake system for receiving said source of fluid under pressure, said seal preventing the flow of fluid from the boost chamber until said predetermined operator signal terminates.

3. The integrated control mechanism, as recited in claim 2, further including:
   piston means located in said housing and responsive to said source of fluid in said boost chamber and said operator braking signal for pressurizing fluid in a brake chamber to effect a brake application.

4. The integrated control mechanism, as recited in claim 3, further including
   valve means having a movable wall with a first face exposed to the fluid pressure in the brake chamber and a second face exposed to the fluid pressure in the boost chamber, said movable wall responding to a predetermined pressure differential between said brake chamber and said boost chamber to allow fluid stored in an accumulator to enter said boost chamber and move the piston means to further pressurize the fluid in the brake chamber.

5. The integrated control mechanism, as recited in claim 4, wherein said valve means further includes:
   charging means connected to said accumulator for allowing the pressurized fluid from the single source to flow into and be retained in the accumulator until transmitted to said boost chamber by the operation of said valve means.

6. The integrated control mechanism, as recited in claim 5 wherein said valve means further includes:
   a poppet having a first face exposed to the pressurized fluid in said accumulator and a second face exposed to the fluid in the boost chamber, said pressurized fluid in said accumulator acting on said first face to urge said second face against a seat, said wall means engaging said poppet when moved by said predetermined pressure differential to move said second face away from said seat and thereafter allow the fluid stored in the accumulator to flow into said boost chamber.

7. The integrated control mechanism, as recited in claim 6, wherein said charging means includes:
   a second cylindrical member having a passage therein connected to said single source of pressurized fluid and the accumulator, and
   a resilient band having a first surface exposed to the pressurized fluid in said passage and a second surface exposed to the pressurized fluid in said accumulator, said pressurized fluid in the accumulator acting on said second surface to urge said first surface toward a seat and interrupting communication between the accumulator, and said single source of fluid when a predetermined fluid pressure is reached in the accumulator.

8. The integrated control, as recited in claim 7, wherein said charging means further includes:
   relief valve means connected to said passage for allowing fluid to escape from said accumulator whenever the pressure therein exceeds a predetermined value.

9. The integrated control mechanism, as recited in claim 5, wherein said charging means includes:
   a second cylindrical member having a passage therein connected to said single source of pressurized fluid and the accumulator, and
   a resilient band having a first surface exposed to the pressurized fluid in said passage and a second surface exposed to the pressurized fluid in said accumulator, said pressurized fluid in the accumulator acting on said second surface to urge said first surface toward a seat and interrupting communication between the accumulator and said single source of fluid when a predetermined fluid pressure is reached in the accumulator.

10. The integrated control, as recited in claim 9, wherein said charging means further includes:
    relief valve means connected to said passage for allowing fluid to escape from said accumulator whenever the pressure therein exceeds a predetermined value.

11. In a vehicle having a brake system and a steering system, an integrated control mechanism for regulating the communication from a single source of pressurized fluid to the brake system and the steering system in response to independent brake and steering signals from an operator, said integrator control mechanism comprising:

a housing having first and second bores therein and a boost chamber, said first bore being connected to the brake system, said second bore being connected to the steering system and the source of pressurized fluid;

sleeve means located in said second bore and having a series of peripheral lands thereon and a first series of radial passages therethrough for connecting the source of pressurized fluid to the interior of the sleeve means;

a rotary valve having a first cylindrical member located in said sleeve means with a first axial bore therein and a second series of radial passages therethrough for connecting said first axial bore with the first series of radial passages, said rotary valve being connected to the steering system;

a spool valve having a second cylindrical member located in said first axial bore and having a second axial bore connected to said boost chamber, said second cylindrical member having a first groove and a second groove on the peripheral surface thereof separated by first and second metering lands, said second groove being connected to said second axial bore by a third series of radial passages, said first groove being connected to said first and second series of radial passages to establish a continuous flow path for the source of pressurized fluid through said housing;

piston means located in said first bore to separate a brake pressure chamber from said boost chamber;

linkage means having a lever arm with a first end fixed to said piston and a second end for operating said spool valve;

brake input means connected to said linkage means and responsive to an operator brake signal for moving said second end and causing said spool valve to move in said first axial bore and meter the pressurized fluid present in the first groove past the second metering land and into said second groove for distribution to said boost chamber, said pressurized fluid in said boost chamber acting on said piston means to pressurize fluid in said brake chamber and thereby supply the brake system with an operational brake signal; and steering input means connected to said rotary valve for transmitting an operator steering signal to the steering system, said rotary valve responding to the operator steering signal to restrict the flow of the pressurized fluid from the source through said first and second series of radial passages and provide the steering system with pressurized fluid to amplify the operator steering signal.

12. The integrated control mechanism, as recited in claim 11, further including:

a third bore in said housing having a first passage connected to said brake chamber, a second passage connected to said boost chamber and a third passage connected to an accumulator;

wall means located in said third bore for separating said first passage from said second passage;

valve means located in said third bore for separating said second passage from said third passage, said operational brake signal acting on and moving said wall means toward said valve means to initiate fluid communication between said accumulator and said boost chamber through said second and third passages whenever the fluid pressure differential between the brake chamber and the accumulator reaches a predetermined value, to allow the fluid pressure in the accumulator to assist in moving said piston means.

13. The integrated control mechanism as recited in claim 12, further including:

charging means connected to said source of pressurized fluid for allowing pressurized fluid to be communicated to said accumulator.

14. The integrated control mechanism as recited in claim 13, further including:

a disc having a bore therethrough and connected to said spool valve, said first cylindrical member of said spool valve having a series of slots adjacent the end thereof;

seal means connected to said disc and adopted to engage said rotary valve in response to movement of said second end of said linkage means by the operator brake signal, said means allowing said pressurized fluid in said passage to only flow into said booster chamber, and thereby preventing any of the pressurized fluid transmitted from the accumulator to the boost chamber to flow back into the passage for the duration of said operator brake signal.

* * * * *